July 18, 1933.  E. H. MITCHAM  1,918,658
JUICE EXTRACTOR
Filed Feb. 21, 1930   3 Sheets-Sheet 1
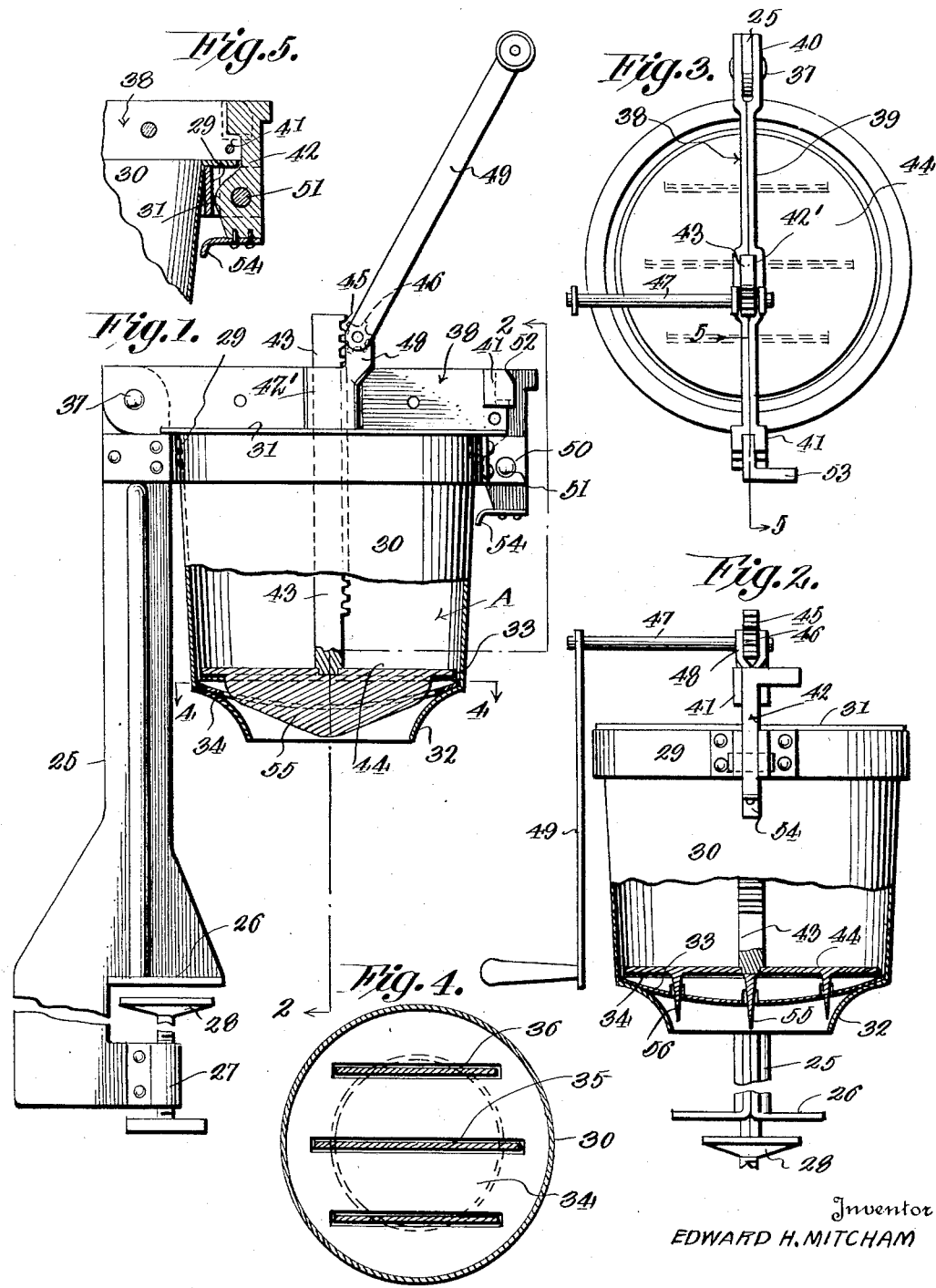
Inventor
EDWARD H. MITCHAM
By Irving L. McCathran
Attorney July 18, 1933.   E. H. MITCHAM   1,918,658
JUICE EXTRACTOR
Filed Feb. 21, 1930   3 Sheets-Sheet 2
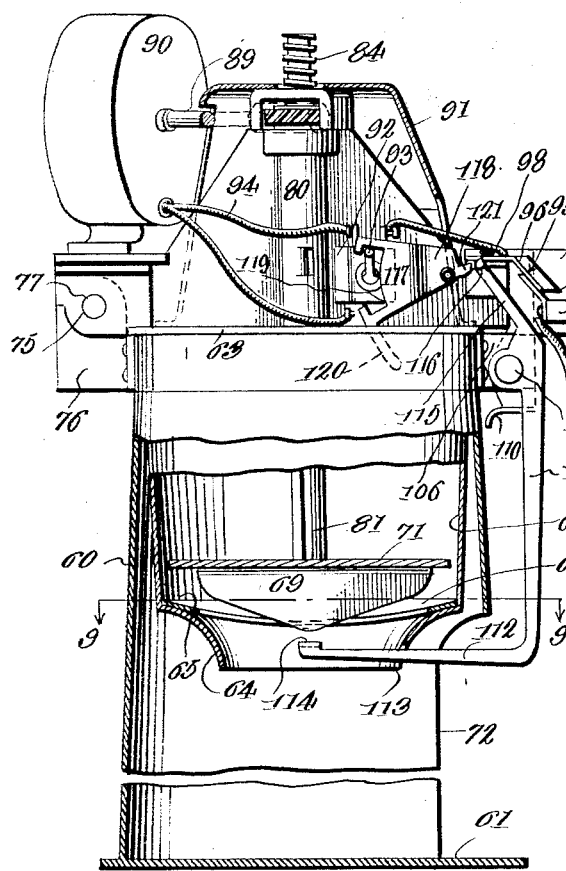
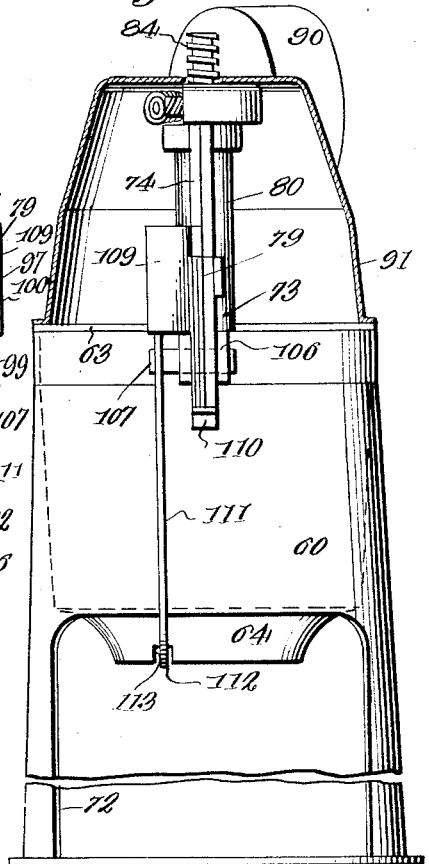
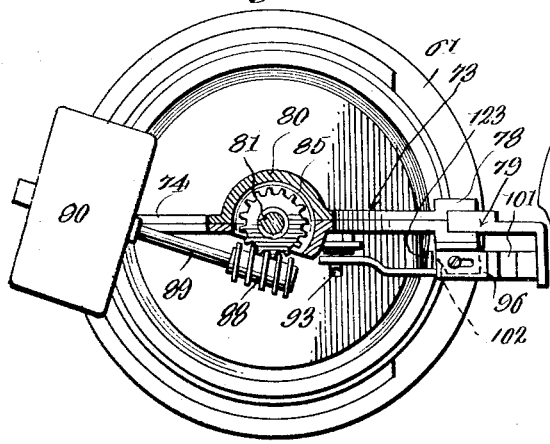
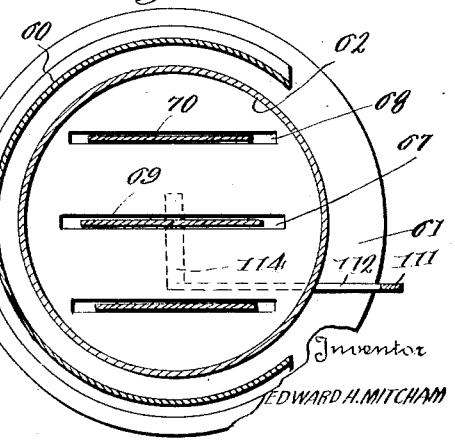
Inventor
EDWARD H. MITCHAM
By Irving S. W. Cattran
Attorney

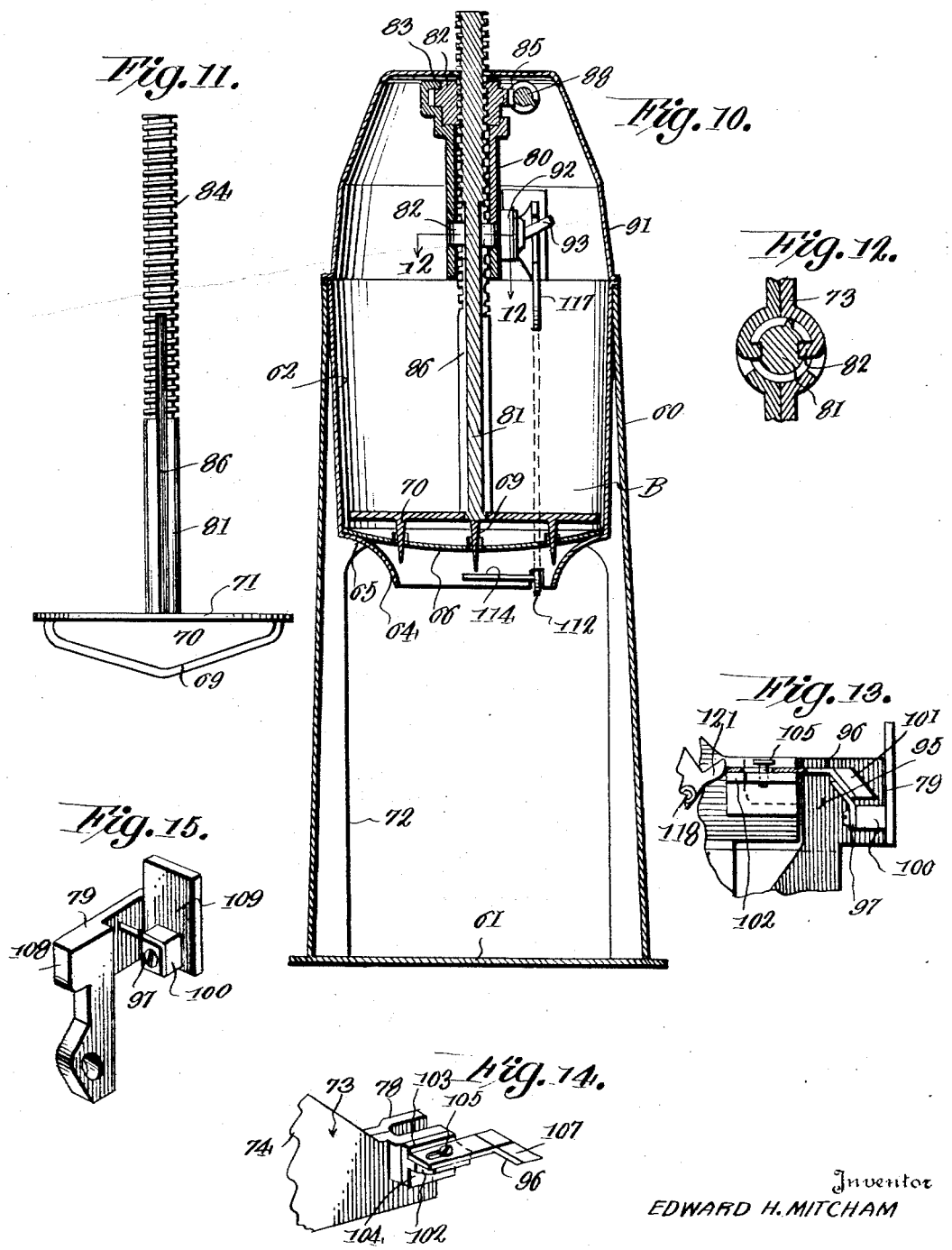

Patented July 18, 1933

1,918,658

UNITED STATES PATENT OFFICE

EDWARD H. MITCHAM, OF NEW YORK, N. Y.

JUICE EXTRACTOR

Application filed February 21, 1930. Serial No. 430,326.

This invention appertains to presses and more particularly to a citrus fruit squeezer.

One of the primary objects of my invention is to provide a novel device for extracting juice from oranges, lemons, and the like, in which the fruit is placed directly within the extracting bowl to be operated upon by a reciprocatory plunger, the plunger having a presser plate provided with cutting knives for severing the fruit at the same time of the pressing operation to insure all of the extraction of the juice therefrom.

Another important object of my invention is the provision of a bed plate arranged within the bowl upon which the fruit is received having slots therein through which the cutting knives extend, the cutting knives serving as means for partially closing said slots to prevent the entrance of pulp through the slots and into the juice receiving cup, the knives having a tendency to withdraw the pulp above the bed plate upon the withdrawing of the plunger.

A further object of my invention is the provision of novel means for operating the plunger so as to insure proper pressure being applied to the fruit acted upon.

Another salient object of my invention is the provision of novelly arranged knives on the presser head, the presser head being provided with a central diametrically extending main severing knife and side auxiliary spaced parallel knives, whereby the fruit will be severed at the most advantageous point for permitting the effective squeezing of the cut sectors.

A further object of my invention is the provision of a novel swinging head carried by the supporting standard, the swinging head carrying the slidable expressing plunger and a cap for the bowl receiving the fruit to be squeezed.

A further object of my invention is the provision of a novel latch for holding the head in operative position relative to the bowl.

A further object of my invention is the provision of power operated means for operating the expressing plunger with a novel reversible switch automatically actuated for controlling the path of movement of the expressing plunger.

A further object of my invention is the provision of a novel device for operating a reversing switch for the electric drive motor when the expressing plunger reaches the end of its travel at either end of the bowl, with means for automatically operating the main control switch for cutting off the power through the expressing plunger when the same has been returned to its raised normal operative position.

A still further object of my invention is to provide novel means for mounting the expressing plunger and motor on the pivoted head.

A still further object of my invention is to provide an improved fruit squeezer of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:—

Figure 1 is a side elevation of one form of my improved fruit squeezer showing parts of the bowl and plunger broken away and in section.

Figure 2 is a section through the same taken on the line 2—2 of Figure 1 looking in the direction of the arrows.

Figure 3 is a top plan view of the improved device.

Figure 4 is a detail horizontal section taken on the line 4—4 of Figure 1 looking in the direction of the arrows showing the removable bed plate with the slots therein for receiving the knives.

Figure 5 is a detail vertical section taken on the line 5—5 of Figure 3 looking in the direction of the arrows illustrating the novel latch for the swinging head.

Figure 6 is a side elevation of the power operated form of my improved fruit squeezer with parts thereof broken away and in section.

Figure 7 is a front elevation of the same showing parts thereof broken away and in section.

Figure 8 is a top plan view with the protecting casing for the swinging head removed and with parts of the head broken away and in section.

Figure 9 is a horizontal section through the bowl and support taken on the line 9—9 of Figure 6 looking in the direction of the arrows illustrating the position of the trip arm relative to the severing knives.

Figure 10 is a vertical central section through the improved device.

Figure 11 is a detail front elevation of the expressing plunger.

Figure 12 is a detail horizontal section taken on the line 12—12 of Figure 10 looking in the direction of the arrows illustrating the means for mounting the plunger stem within its guide.

Figure 13 is a fragmentary side elevation of the device illustrating the latch and the main switch for controlling the electricity through the motor.

Figure 14 is a fragmentary detail perspective view of one end of the swinging head showing the keeper for the latch and sliding contact carried thereby for the main switch.

Figure 15 is a detail perspective view of the latch showing one of the switch contacts carried thereby.

Referring to the drawings in detail, wherein similar reference characters designate corresponding parts throughout the several views, the letter A generally indicates the hand operated form of my improved fruit squeezer as shown in Figures 1 to 5 inclusive and the reference character B indicates the power operated fruit squeezer as illustrated in Figures 6 to 15 inclusive.

The improved device A comprises a supporting standard 25 which can be formed of pressed sheet metal or cast iron, as desired and the lower end thereof is shaped to provide a table clamp engaging foot 26. The standard 25 below the foot 26 is provided with a laterally extending arm 27 for receiving the adjustable table engaging clamping jaw 28 and it is obvious that by this construction the standard can be firmly clamped to the edge of a table or the like.

The upper end of the standard 25 has riveted or otherwise secured thereto a horizontally disposed collar which receives the fruit expressing bowl 30 which can be made of any desired material, such as sheet metal. The upper end of the bowl 30 is provided with an annular flange 31 for engaging the upper edge of the collar 29. The extreme lower end of the fruit receiving bowl 30 is contracted to provide a reduced outlet neck 32 under which the receptacle for receiving the fruit juice is placed. The contracting of the lower end of the fruit bowl 30 provides an internal annular shoulder 33, on which is adapted to seat the detachable bed plate 34. In accordance with my invention, this bed plate 34 is provided with a central diametrically extending slot 35 and spaced parallel side slots 36 for a purpose, which will be later more fully described.

The extreme upper end of the standard 25 above the collar 29 has connected thereto by means of a pivot pin 37 the swinging head 38, which is adapted to extend diametrically across the upper end of the fruit receptacle 30. This head 38 can be made in any desired way and if preferred, the same can be constructed from a pair of companion straps 39 of the desired gage and suitably riveted together. As shown, the rear ends of the straps are offset laterally to provide the ears 40 for embracing the opposite sides of the standard 25, the pivot pin 37 extending through the ears 40 and said standard. The forward end of the head 38 can have the straps 39 thereof likewise offset laterally to provide a keeper 41, for the swinging latch 42, which also will be later described. It is to be also noted that the straps 39 at a point equidistant their ends can be offset laterally in opposite directions to provide a guide 42¹ for slidably receiving the plunger stem 43 of the plunger 44. This plunger stem 43 is provided with rack teeth 45 on one edge thereof, and meshing with said teeth is a pinion 46. The pinion 46 is keyed or otherwise secured to a transverse shaft 47 rotatably carried by upstanding ears 48 formed on the cross head 38. One end of the shaft has keyed or otherwise secured thereto the operating crank 49, whereby upon suitable movement of the crank the expressing plunger 44 can be raised and lowered.

The latch 42 is of a novel construction and is received between angle bracket supports 50, which are riveted or otherwise secured to the supporting collar 29. A pivot pin 51 extends through the angle bracket supports 50 and the latch 42. The upper end of the latch 42 is provided with a locking nose 52 which is adapted to be received within the keeper 41 when the head 38 is in its lowered position. Likewise the upper end of the keeper 42 adjacent to the nose 52 can be provided with a laterally extending manipulating thumb piece 53 for swinging the latch on its pivot 51 and out of engagement with the keeper. If preferred, the lower end of the swinging latch can be provided with a leaf spring 54 for engaging the bowl 30 and which spring functions to normally return the latch to its normal position in engagement with the keeper.

The plunger head 44 is in the nature of a disc and has secured thereto the centrally disposed diametrically extending cutting knife 55, which is of preferably a substantially V-shape to provide a central leading cutting point. This blade or knife 55 is adapted to extend through the central slot 35 in the bed plate 34 when the plunger is in its lowermost position. On opposite sides of the central knife 55, the plate or plunger 44 carries the depending side spaced parallel cutting knives 56, which are preferably, but not necessarily, of a less width than the central blade 55. These blades 56 are also preferably of a V-shape and are adapted to extend through the side slots 36 in the bed plate 34 when the plunger is in its lowered position. The bed plate 34 can be of a substantially concavo-convex shape, if desired for facilitating the seepage of the juice through the slots 35 and 36, and if preferred this plate can be provided with other drain openings.

In use of my improved device the latch 42 is swung away from its keeper 41 and after which the head 38 is swung back allowing the orange or other fruit to be squeezed to be placed within the bowl 30. The head 38 is now swung to its lower position and the latch is engaged with its keeper. The crank 49 is now rotated in the desired direction for moving the plunger 44 downwardly and the knives 55 and 56 will sever the fruit and then press the same so as to express all of the juice therefrom. After the fruit has been severed and part of the juice has been extracted therefrom the knives will start entering the slots 35 and 36 and thus partially close the same. Upon continued downward movement of the plunger, the fruit is further subjected to a pressing action but the pulp thereof is prevented from going through the slots due to the passage of the knives therethrough. Thus while all of the juice is extracted from the fruit the pulp thereof is retained in the bowl. Upon the reverse turning movement of the crank 49 the plunger will be raised and the knives will pull the pulp upward therewith and the same can be readily cleaned.

From the foregoing description, it can be seen that I have provided a novel and simple fruit juice extractor which will be easy to operate and which will require a minimum amount of work on the part of the operator. If desired, the plunger can be power operated and in the form B illustrated in Figures 6 to 15 inclusive I have shown a power operated plunger.

In this form of my invention I provide a body shell or casing 60 of substantially cylindrical form, the lower end of which is mounted upon a base plate 61 of disc shape. The base plate 61 and the body casing or shell 60 can be constructed from sheet metal suitably treated to present an ornamental appearance and the upper end of the shell 60 can taper toward its upper end if preferred. Fitted into the shell 60 from the upper end thereof is the fruit receiving bowl 62 having the annular flange 63 formed on its upper end for engaging the upper edge of the shell. This bowl 62 can taper toward its lower end and the extreme lower end thereof contracted to provide an outlet spout 64. This spout 64 provides an internal annular shoulder 65 for the reception of a concavo-convex bed plate 66, against which the fruit is adapted to be pressed. This bed plate 66 is provided with a central diametrically extending slot 67 and side spaced parallel slots 68 for the reception of the central knife 69 and the side cutting knives 70 carried by the plunger 71. One side of the shell 60 adjacent to its lower end is cut away as at 72 to provide an entrance opening into the shell through which the receptacle for receiving the fruit juice spout 64 can be placed.

Extending diametrically across the upper end of the shell 60 is the swinging head 73 which may be formed from companion strap sections 74. The rear ends of the strap iron pieces 74 can be bent laterally in opposite direction to provide pivot ears 75 for straddling a bracket 76 riveted or otherwise secured to the shell 60 adjacent to its upper end, a pivot pin 77 being extended through the ears 75 and said bracket. The opposite ends of the straps 74 can likewise be bent offset laterally in opposite directions as at 78 to provide a keeper for the swinging latch 79 which will be later described. If desired, the straps 74 can be in the nature of triangular shaped abutting plates, as illustrated in Figures 6 and 7 of the drawings, in which instance the central portion of the plates are bowed in opposite directions to provide the longitudinally extending substantially cylindrical guide 80 for the plunger stem 81. The upper end of the guide sleeve or cylinder 80 is enlarged to provide a casing for a feed nut 82, the upper end of the casing having laterally bent ears 83 for engaging the top of the nut to prevent displacement thereof. As shown, the stem 81 of the plunger is provided with screw threads 84 and the nut 82 is threaded on or receives said stem and the outer face of this stem is provided with worm wheel 85 to permit the rotation thereof, by means which will be later described. In order to prevent rotation of the plunger stem 81 in its guide and nut 82 the same is provided with longitudinally extending slots 86 for slidably receiving bent in tongues 87 formed on the cylindrical sleeve or guide cylinder 80.

The nut 82 and its worm wheel 85 is adapted to be driven from a worm 88 which is suitably secured to the armature shaft 89 of an electric drive motor 90, which is bolted or otherwise secured to the swinging head 73 adjacent to one end thereof. I prefer to house the worm and worm wheel and other parts of my device in an upper casing or shell 91 which can be secured to the head 73 for swinging movement therewith.

It is obvious that when current is turned on from the motor 90 that the same will rotate the worm and worm wheel for feeding the plunger downwardly or upwardly as the case may be. The motor 90 is of a reversible type and I provide a reversing switch 92 therefor which can be of the snap toggle type embodying the swinging switch lever 93. This switch can be secured to one of the side plates of the straps 74 of the swinging head as shown. The reversible switch 92 is connected to the motor by suitable feed and return wires 94. A main switch 95 is provided for breaking the circuit to the motor as will be later described, but it is to be noted that the main switch 95 includes contacts 96 and 97 which have connected thereto electric conducting wires 98 and 99 respectively. The contact 97 can be considered a stationary contact and is secured to a block of insulation 100 which is in turn connected to the swinging latch 79 as will be more fully described. The contact 96 can be considered as the sliding contact and as movable toward and away from the stationary contact 97. The sliding contact 96 is provided with an insulating manipulating button 101 and a laterally extending foot 102 which is slidably mounted on a supporting bracket 103 secured to the swinging head 73 at one side of the latch keeper 78. The foot 102 of the sliding contact 96 is provided with a slot 104 through which extends a retaining screw 105. This screw 105 extends into the bracket 103 but the head of the screw is spaced from the foot to allow upward flexing movement of the foot as will be later described. It is to be noted that the corner of the bracket 103 at the inner end thereof is cut away for a purpose, which will be later described. As stated, the contact 97 is carried by the latch 79 which is pivoted adjacent to its lower end to a pivot bracket 106 secured to the shell 60 adjacent to the upper end thereof. A pivot pin 107 extends through the said bracket 106 and through the latch 79. The upper end of the latch 79 is provided with a forwardly extending nose 108 which is adapted to engage over the keeper 78 of the head for retaining the said head in its closed lowered position. The latch 79 in rear of the nose 108 is provided with a manipulating handle 109 for facilitating the swinging of said latch, the contact 97 being connected to said handle 109. If preferred, the lower end of the latch 79 can carry a leaf spring 110 for engaging the shell when the latch is swung rearwardly and the spring functions to throw back the latch to its normal operative position in the path of and in engagement with the keeper.

Rockably mounted on the pivot pin 107 is a trip lever 111 which extends along one side of the shell 60. The lower end of the trip lever 111 is provided with an inwardly directed arm 112 which extends through a notch 113 formed in the lower edge of the spout 64 of the fruit bowl 62. The inner end of the arm 112 is provided with a laterally extending plate 114 which is disposed in the path of the central knife 69 for a purpose, which will be later described. The upper end of the lever 111 is provided with a forwardly inclined arm 115 which is provided with a tripping head 116, which operates in conjunction with a swinging trip plate 117 for the handle 93 of the reversing switch 92. This trip plate 117 is of a substantially triangular shape and is pivoted as at 118 on one side plate 74 of the head 73. The rear base end of the trip plate 117 is provided with a cut out portion 119 for receiving the said switch lever 93. A depending tail 120 is formed on the inner lower end of the trip switch plate 117. The forward end of the trip plate is provided with a cam shaped nose 121 which is disposed within the path of the head 116 of the swinging trip lever 111. It is to be also noted that the upper outer corner of the foot 102 of the sliding contact 96 of the switch 95 is disposed in the path of this nose, for a purpose, which will be more clearly brought out. If preferred, the latch plate can be provided with a laterally extending lug 123 for limiting the rearward sliding movement of the sliding contact 96.

In operation of the power driven fruit presser, the fruit to be pressed is placed within the bowl 62 and considering that the plunger is in its raised position the swinging head is moved to its lowered position to dispose the plunger within the bowl and the latch 79 is manipulated so as to hold the head in its lowered position, and the insulating knob 101 of the sliding contact 96 is pushed inwardly to engage this contact with the stationary contact 97. This will close the circuit through the motor 90 which will be driven in the proper direction for turning the feed nut and consequently threading the plunger downward to express the juice and cut the fruit. When the expressing operation has been completed, the cutting knife 69 will engage the foot 114 of the swinging lever 117 swinging the same outward and the inner end of the head 116 thereof inward into engagement with the cam nose 121 of the swinging switch plate 117. This will swing the nose upward past the rear end of the foot 102 of the sliding contact which is permitted due to the lost motion between the head of the screw 105 and said foot 102. The trip plate 117 will be swung downward causing the movement of the switch handle 93 of the reversing switch 92 downward which will reverse the motor 90 allowing the upward feeding of the plunger. When the plunger 71 reaches the limit of its upward movement the same will engage the tail 120 of the switch trip plate 117 again moving the same upward causing the switch handle 93 to be again raised for again reversing the motor for feeding the plunger 71 downward. Simultaneous with this movement the nose 121 of the trip plate will be swung downward and its cam surface will force the sliding contact plate 96 forward and out of contact with the stationary contact 97 thus breaking the circuit and preventing further rotation of the motor. It is obvious that the latch can now be swung away from its keeper to permit the head to be raised for removing the fruit skin and pulp from the bowl and also the knives.

Changes in details may be made without departing from the spirit or the scope of this invention, but:—

What I claim as new is:

1. A fruit squeezer comprising a support, a bowl carried by the support, an expressing plate in the bowl, a swinging head carried by the support and movable over the bowl, means for latching the head in its operative position over the bowl, a plunger slidable in the bowl toward and away from the expressing plate, an electric drive motor of the reversible type for operating the plunger, a reversing switch for the motor carried by the head, a circuit breaker carried by the head including a sliding contact, and means for automatically operating the reversing switch by the plunger at the end of its travel in both directions, and means for actuating the sliding contact of the circuit breaker by said last mentioned means when the plunger reaches its uppermost position in the bowl.

2. A fruit squeezer comprising a support, a bowl carried by the support, an expressing plate in the bowl, a plunger slidable in the bowl toward and away from the plate, a swinging head movable over the bowl, a latch for holding the head in its operative position over the bowl, a plunger carried by the head movable in the bowl toward and away from the expressing plate, a reversible electric drive motor carried by the head for operating the plunger, a reversing switch for the motor including a swinging lever, a pivoted trip plate rockable on the head having a yoke receiving the lever, a cam nose on the trip plate on the opposite side of the pivot from said yoke, a rocking trip lever carried by the support, a trip arm on said lever arranged below the plunger and in the path thereof for rocking the lever when the plunger reaches its lowermost position, and a depending trip lug on said yoke of the trip plate arranged above the plunger and disposed in the path thereof.

3. A fruit squeezer comprising a support, a bowl carried by the support, an expressing plate in the bowl, a plunger slidable in the bowl toward and away from the plate, a swinging head movable over the bowl, a latch for holding the head in its operative position over the bowl, a plunger carried by the head movable in the bowl toward and away from the expressing plate, a reversible electric drive motor carried by the head for operating the plunger, a reversing switch for the motor including a swinging lever, a pivoted trip plate rockable on the head having a yoke receiving the lever, a cam nose on the trip plate on the opposite side of the pivot from the yoke, a rocking trip lever carried by the support, a trip arm on said lever arranged below the plunger and in the path thereof for rocking the lever when the plunger reaches its lowermost position, a depending trip lug on said yoke of the trip plate arranged above the plunger and disposed in the path thereof, a circuit breaker including a sliding contact carried by the head and a stationary contact carried by the support, a cam head on the upper end of the trip lever for engaging the cam nose of the trip plate, the sliding contact being arranged in the path of said cam nose, and means for permitting the flexing of the sliding contact in one direction relative to said nose.

EDWARD H. MITCHAM.